E. H. SEARLE.
AIR RIFLE.
APPLICATION FILED AUG. 25, 1909.
1,063,072.
Patented May 27, 1913.
5 SHEETS—SHEET 1.
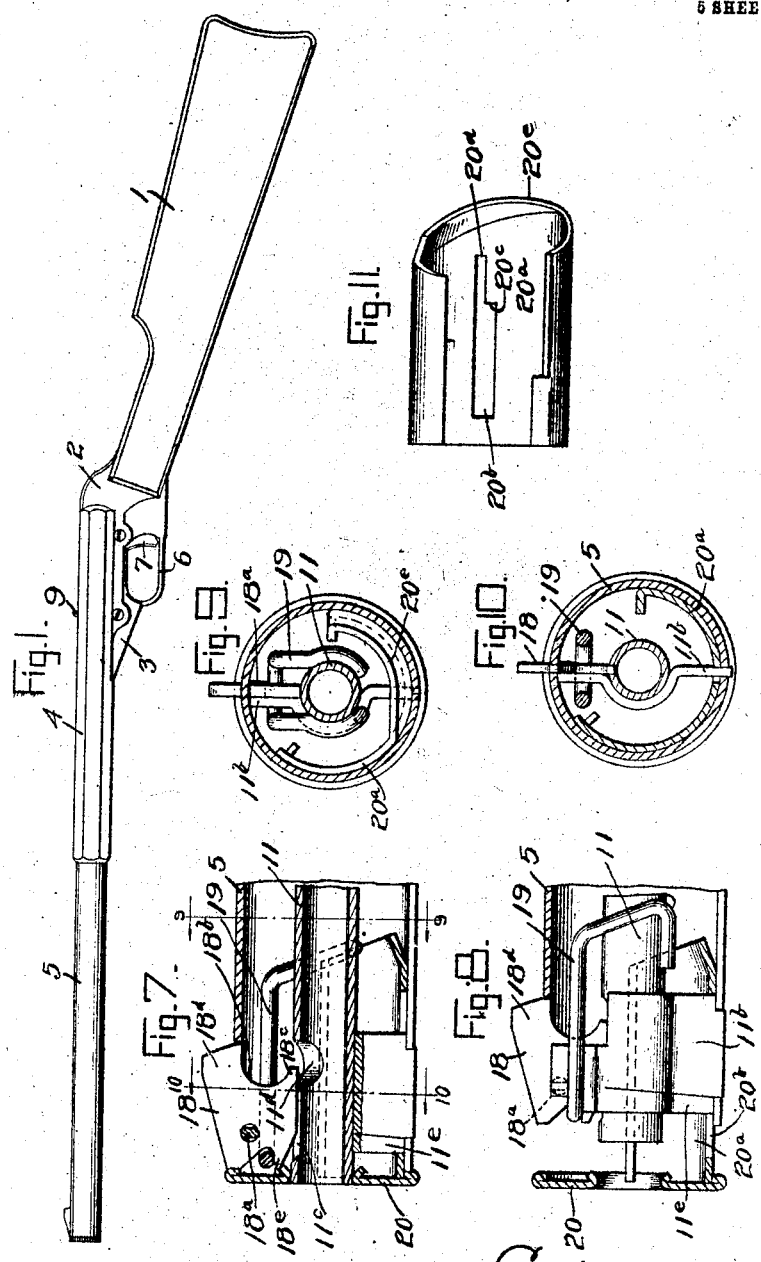
Witnesses
Inventor
Elbert H Searle
By Knight Bros.
Attorney

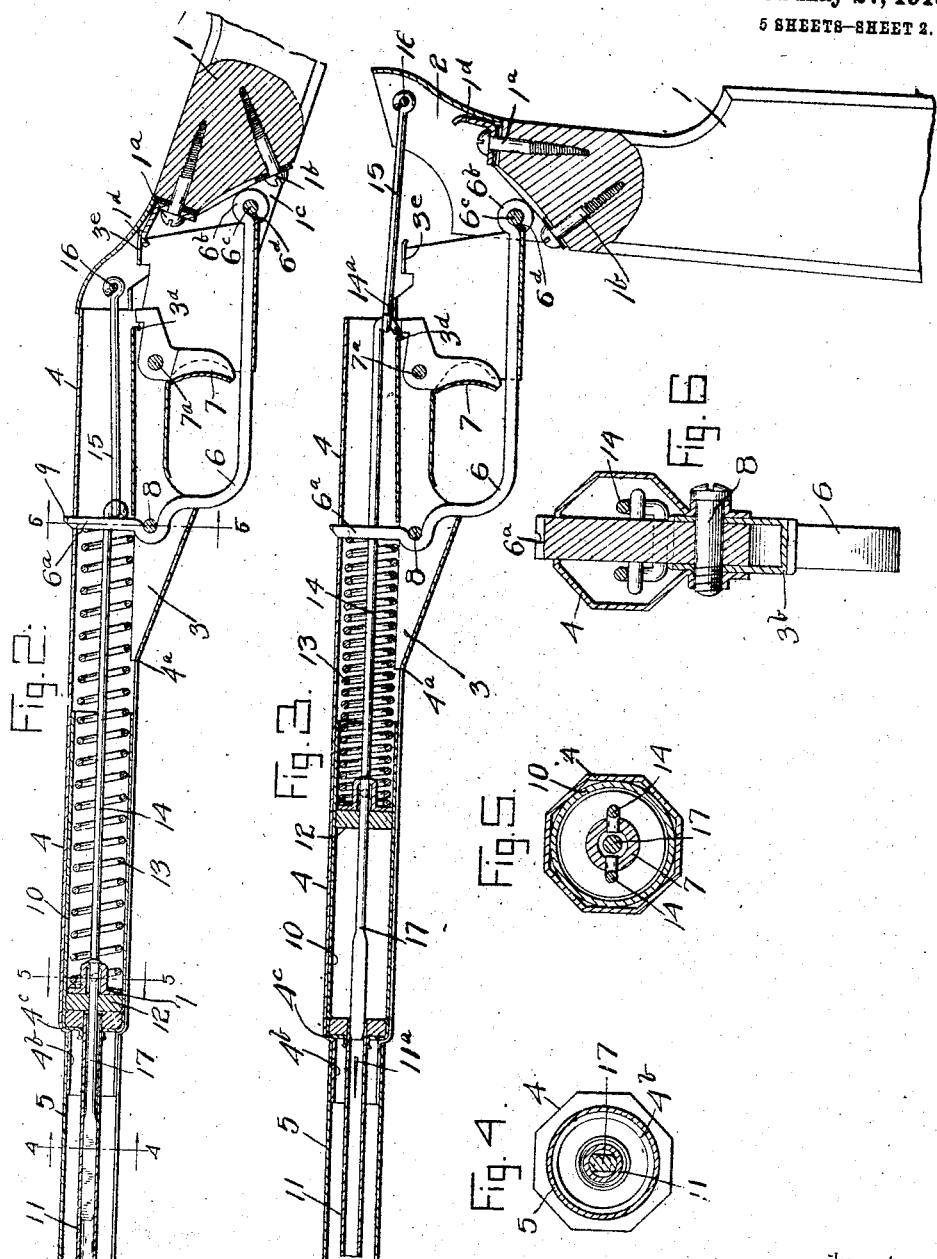

E. H. SEARLE.
AIR RIFLE.
APPLICATION FILED AUG. 25, 1909.
1,063,072.
Patented May 27, 1913.
5 SHEETS—SHEET 3.
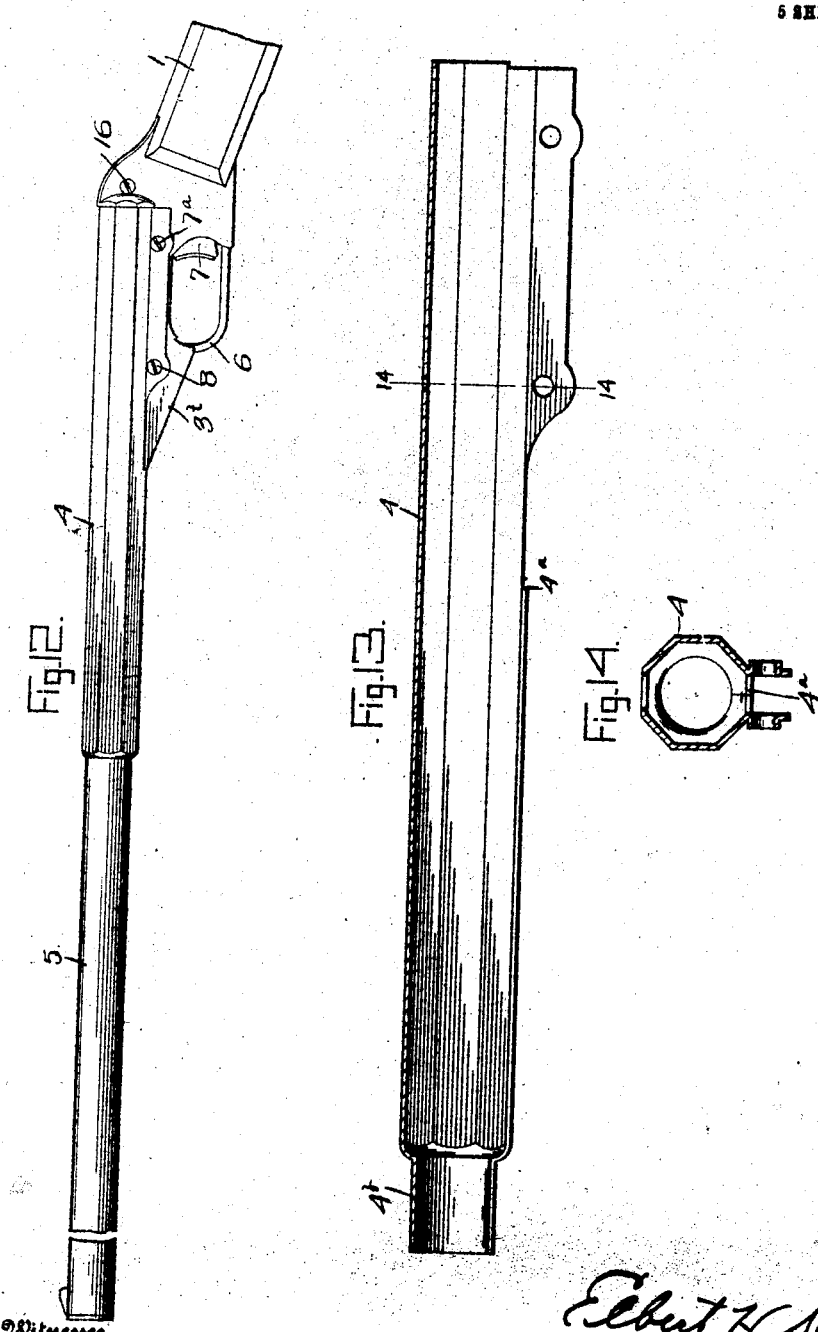

E. H. SEARLE.
AIR RIFLE.
APPLICATION FILED AUG. 25, 1909.
1,063,072.
Patented May 27, 1913.
5 SHEETS—SHEET 4.
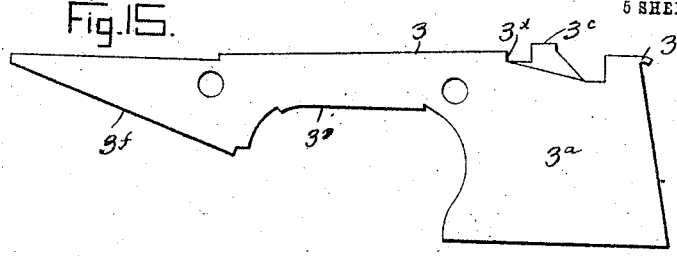
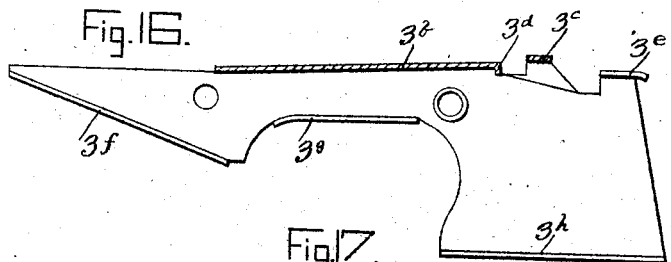
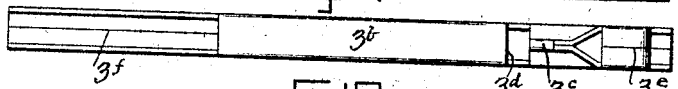
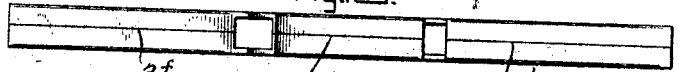
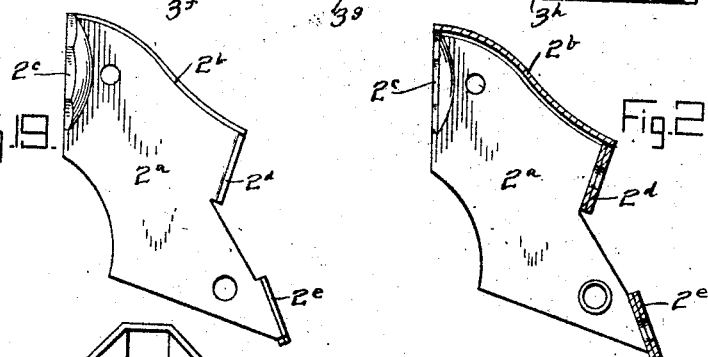
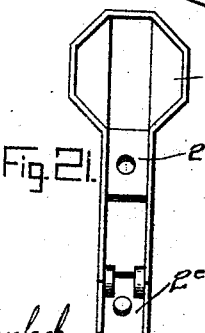
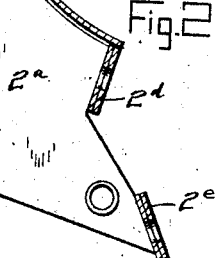
Witnesses
Inventor
Elbert H. Searle
By Knight Bros.
Attorneys

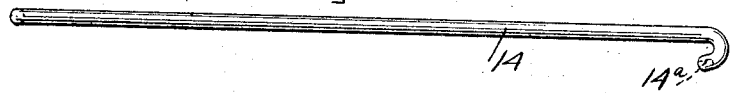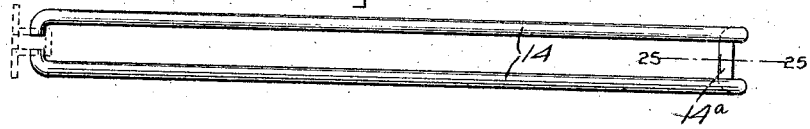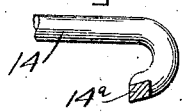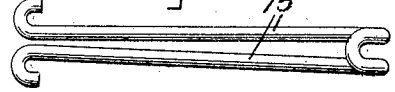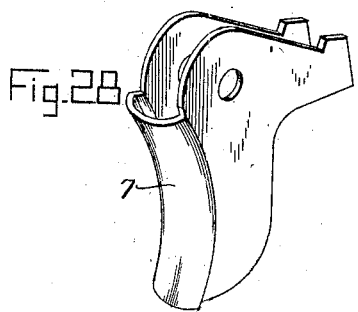

UNITED STATES PATENT OFFICE.

ELBERT HAMILTON SEARLE, OF SPRINGFIELD, MASSACHUSETTS.

AIR-RIFLE.

1,063,072.　　　　　Specification of Letters Patent.　　Patented May 27, 1913.

Application filed August 25, 1909.　Serial No. 514,641.

*To all whom it may concern:*

Be it known that I, ELBERT H. SEARLE, a citizen of the United States, residing at Springfield, in the county of Hampden and State of Massachusetts, have invented certain new and useful Improvements in Air-Rifles, of which the following is a specification.

My present invention relates to air rifles of that type in which a projectile is propelled by air pressure developed by a spring actuated piston. Guns of this type are generally manufactured for sale as toys and it is essential that the construction be both cheap and durable.

The object of my invention is to improve the construction of the several parts of the gun of this general type along the lines of simplicity and cheapness, without sacrificing durability or effectiveness.

My invention will be fully understood upon reference to the accompanying drawings in which,—

Figure 1 is a side view of a gun in which several pieces of my invention may be embodied. Fig. 2 is a vertical axial section of the same, on an enlarged scale, with the front and rear ends omitted; the parts being shown in the positions which they occupy immediately after firing. Fig. 3 is a view similar to Fig. 2 with the parts in the positions which they assume in the act of cocking the gun or putting its spring under pressure. Figs. 4, 5 and 6 are vertical transverse sections taken respectively on the lines 4—4, 5—5 and 6—6 of Fig. 2. Figs. 7 and 8 are vertical axial sections of the forward end of the gun showing the magazine closure and the means for transferring individual projectiles from the magazine to the true barrel; also the means which permit the magazine closure to open when the magazine is to be charged. Figs. 9 and 10 are vertical transverse sections taken respectively on the lines 9—9 and 10—10 of Fig. 7. Fig. 11 is a detail plan view of the guiding flange of the magazine closure. Fig. 12 is a detail view, on an enlarged scale, showing the forward portion of the gun in elevation. Fig. 13 is a vertical axial section of the action case. Fig. 14 is a section on the line 14—14 of Fig. 13. Figs. 15, 16, 17 and 18 are detail views of the frame extension respectively showing said part in side elevation, in vertical section, in top view, and in bottom view. Figs. 19, 20, 21 and 22 are detail views of the frame respectively, showing said part in side elevation, in vertical section, in front end elevation, and in top plan. Figs. 23 and
24 are a side elevation and top plan view respectively of the cocking rod. Fig. 25 is a sectional view taken along the line 25—25 of Fig. 24. Figs. 26 and 27 are a side elevation and top plan view respectively of the connecting link for the cocking rod, and; Fig. 28 is a detailed perspective view of the trigger.

1 represents the stock of the gun, 2 the frame, 3 the frame extension, 4 the action case, 5 the false barrel, and 6 the trigger guard.

As will be seen upon reference to Figs. 1, 2 and 3, the stock 1 is suitably recessed to receive the frame 2, and as shown in Figs. 1 to 3 and 19 to 22, the frame consists of a sheet metal member struck up to provide side plates $2^a$, top connecting web $2^b$, a forwardly presented abutment $2^c$, and overlapped attaching portions $2^d$ and $2^e$, perforated to receive the attaching screws $1^a$ and $1^b$ which enter the stock and secure the frame in position.

As shown in Figs. 15 to 18, the frame extension 3 is constructed of sheet metal fashioned and struck up in a manner to provide side plates $3^a$, connecting web $3^b$, converging lips $3^c$ providing a sear $3^d$, the latching web $3^e$, the inclined connecting web $3^f$, and the bottom closing flanges $3^g$ and $3^h$. As shown in Figs. 1, 2 and 3, the frame extension 3 is secured to the action case 4, through means of the pintle $7^a$ of the trigger 7 and the transverse screw 8, and said frame extension is connected through breakdown or hinge connection with the frame 2, through the medium of the trigger guard 6 which has a vertical portion $6^a$ projecting through the cylindrical part of the action case 4 in position to provide a rear sight 9, and passing thence around the screw 8, and thence rearward and terminating in an eye $6^b$ that receives the transverse pin $6^c$. The eye portion $6^b$ of the trigger guard is provided with a restricted opening $6^d$ within which fits the rear edge of the flange $3^h$. This connection prevents relative movement between the trigger guard and the frame extension. The pin $6^c$ passes through the frame and is held in position therein by the sides of the stock mortise $1^c$. The frame extension abuts at its forward end with a shoulder $4^a$ provided in the action case, such abutment being effected through the medium of the connecting web 3ᶠ of the frame extension.

The action case 4 is constructed with a reduced forward end 4ᵇ and with the offset or shoulder 4ᶜ against which the false barrel 5, which is fitted over the extension 4ᵇ, abuts. Within the action case 4, is a cylinder 10 having a closed forward end, that abuts against the shoulder 4ᶜ, and as described in my application filed August 2, 1907, Serial No. 386,847, the forward end of this cylinder is suitably packed to receive the end of the true barrel 11, while working in said cylinder is a piston 12 driven by a spring 13. The rear end of the spring 13 abuts against the end 6ᵃ of the trigger guard member while a cocking rod 14, connected at its forward end to the piston, extends rearward on either side of the abutment 6ᵃ and engages by its transverse portion 14ᵃ, the sear 3ᵈ. A link 15, connected with the cocking rod 14 and with a transverse pin 16 in the frame, draws the rod and through it the piston rearward during the breaking action of the gun, and thereby compresses the spring and cocks the rod, after which the gun members are straightened. When this takes place the latching lip 3ᵉ engages over a tongue 1ᵈ and holds the parts in firing position. In firing the gun, the trigger displaces the rod 14 from the sear 3ᵈ.

The true barrel 11 is constructed at its rear end with a rearwardly disposed knife edge gripping rib 11ᵃ so designed that when a shot gravitates to the rear end of the barrel, it will be firmly gripped and will not run forward should the barrel be thereafter depressed below the horizontal position.

17 represents a drive pin carried by the piston and adapted to impart initial movement to the projectile as described in my aforesaid application Serial No. 386,847; said pin 17 being preferably constructed and arranged as to details, as described in my copending application filed of even date herewith.

The space between the true barrel 11 and the false barrel 5 is adapted to serve as a storage space or magazine for projectiles. To transfer projectiles from this space to the bore of the true barrel, individually and at will, I have constructed the front sight 18 as a transfer device, for which purpose it is pivotally mounted upon a transverse lug 18ᵃ that is fixed upon a diametrical barrel support 11ᵇ. Said sight member 18 is formed with a pocket 18ᵇ adapted to receive a single projectile and to be depressed through a slot 11ᶜ in the true barrel, so as to transfer the projectile which enters its recess 18ᵇ through the feed opening 11ᵈ into the bore of the barrel. The muzzle of the gun is depressed during this action and in order to prevent escape of the projectile forward, the lower end 18ᶜ dips into the barrel until the projectile passes rearward. At the same time the upper end 18ᵈ of the sight dips into the magazine to prevent another projectile entering the feed opening 11ᵈ. The combined sight and feed device 18 is held normally in the position shown by means of a spring 19 which grips the true barrel and engages a lug 18ᵉ on the transfer device.

To close the end of the magazine or storage space a cap 20 abutting the end of the false barrel and centrally bored to receive the end of the true barrel, is so connected with an internal guide flange 20ᵃ as to be movable axially to and from the end of the barrel. This axial movement is limited by the transverse barrel support 11ᵇ which extends through a slot 20ᵇ in the guide flange 20ᵃ. This slot has an offset 20ᶜ in position to engage the transverse member 11ᵇ when the cap is in position to close the end of the magazine, and the parts are held in such position of engagement by means of a spring tongue 11ᵉ which normally presses against one wall of the slot 20ᵇ in a direction to press the flange 20ᵃ laterally. When it desired to draw the cap outward it is rotated in opposition to the pressure of the tongue 11ᵉ, until its offset 20ᶜ is disengaged from the part 11ᵇ and the latter is in the plane of the elongation 20ᵈ of the slot 20ᵇ which then permits axial movement of the cap a distance measured by the length of such elongation of the slot. The inner end of the flange 20ᵃ is deflected as shown at 20ᵉ so as to guide the projectiles to that side of the magazine where the transfer device is located.

Having thus described my invention the following I claim as new therein and desire to secure by Letters Patent:—

1. In a gun, the combination of an action case, a barrel, and an air cylinder; the action case being constructed from a blank of sheet metal bent into a substantially tubular form with a reduced forward end, providing a shoulder; the barrel embracing said reduced end; and the air cylinder being fitted within the action case and in abutment with and sustained by the shoulder provided by the reduced portion.

2. In a gun, the combination of an action case constructed of a blank of sheet metal bent into substantially tubular form and with downwardly projecting flanges, a member interposed between and spacing said flanges apart, a spring located in the action case, and a spring abutment extending through the interposed spacing member and through the action case.

3. In a gun, the combination of an action case, constructed of a blank of sheet metal bent into substantially tubular form and with downwardly projecting parallel flanges spaced apart, a spring located in the action case, and a part extending between parallel flanges and across the interior of the action case to provide a spring abutment; said part extending through the casing and providing a sight member and extending rearwardly from said flanges to provide a trigger guard and connected at its rear end with the frame of the gun.

4. In a spring actuated breakdown gun, the combination of a forward portion and a rear portion separating by a breakdown action, and a single member constituting an abutment for the spring, a sight, and a trigger guard, said member having a fixed connection with one of the gun parts and having hinged action with the other of said parts in order to permit the breakdown action.

5. In a gun comprising a sheet metal frame having forwardly extending side walls and a frame extension having side walls and connected with the frame through means which permits breakdown action between them; a locking means for yieldingly resisting the breakdown action comprising a forwardly extending tongue located at an intermediate point between the side walls of the frame and a transverse connection between the side walls of the frame extension providing a shoulder for the engagement of said tongue.

6. In a gun, the combination of the tubular member constructed with a downwardly presented opening, and a frame member fitted in said opening and secured to the tubular member; the frame member having a transverse web between its side walls within the tubular member and said web portion providing a sear and a means for guiding the sear engaging member thereto.

7. In a gun, the combination of the action case containing actuating mechanism, and the frame member secured to said action case; said frame member being constructed of sheet metal bent to provide side walls and shoulders, one of said shoulders providing a sear for cocking the actuating mechanism, and the other of said shoulders extending upwardly in the rear of the sear and into the path of the actuating means, to limit the rearward movement of the latter.

8. In a gun, the combination of the action case, the frame extension member constructed of sheet metal and having a horizontal and side portions, the horizontal portion being cut away and having an edge providing a sear for gun cocking mechanism, and another part of the web portion being folded and disposed upwardly in the rear of the sear and providing a stop for the cocking mechanism.

9. In a gun, the combination of the gun case containing actuating mechanism and means for cocking the same, and the frame member constructed with side walls, with a uniting web provided at its rear end with a sear for the cocking member and with upward extensions bent inward to provide a stop for said cocking member.

10. In a breakdown gun, the combination with the action case, the frame member secured to the action case, the frame pivotally secured to the member, the actuating mechanism in the action case, the cocking means for said actuating mechanism, a connection between the frame and said means whereby cocking takes place in the breaking down of the gun, and an upwardly disposed and folded portion on the frame extension, located in the path of the cocking means to limit the movement of the latter and through it the breakdown movement of the gun.

11. In a gun, the combination of a frame constructed of sheet metal bent to provide a mounting for the forward portion of the gun with a reduced rear extension and inturned, overlapping tongues on the walls of said reduced extension, a stock having a slotted forward end receiving the reduced portion of the frame and screws passing through the overlapped tongues and into the stock to secure the frame in position.

12. In a gun, the combination of the frame constructed of sheet metal shaped to provide a suitable mounting for the forward portion of the gun and with a reduced rear extension, a frame extension within the frame and having a web portion providing a bottom closure for the latter, the gun stock having a slotted forward end receiving said reduced rear extension and a trigger guard supported upon the said web portion and extending between and secured to the side walls of said reduced rear extension at a point between the walls of the slotted portion of the stock.

13. In a gun, the combination of the frame extension, the frame, and the trigger guard supported upon the frame extension and projecting therefrom, and having pivotal connection with the frame; said frame extension and trigger guard being inter-locked adjacent the rear end of the trigger guard to prevent relative movement between them.

14. In a gun, the combination of the frame extension, the frame and the trigger guard projecting from the frame extension and pivotally connected with the frame through the medium of an eye formed on the trigger guard and a pin engaging said eye; said eye having an opening, and the frame extension having a transverse web entering said opening to engage the frame extension with the trigger guard and prevent relative movement between them.

15. In a breakdown gun, the combination of the front and rear portions having a connection which permits breakdown connection between them, a cocking member carried by the front portion and having connection with the rear portion through which it is drawn rearward to cocking position by the act of breaking down the gun; said forward portion having a transverse web, which affords a guiding surface for the cocking member and provides a sear for said member; and the connection between the cocking member and the rear member being positioned to draw the cocking member down upon the guiding web during the act of cocking and cause it to drop into position behind the sear when reaching the same.

16. A gun comprising front and rear portions connected together by means which permits breakdown action between them; said front member carrying a cocking member and being provided with an inserted member having a transverse web which affords a guiding surface for the cocking member and provides a sear at its rear end; and a connection between the cocking member and the rear member of the gun by which the cocking member is drawn rearward in the act of breaking down the gun; said connection being positioned with respect to the parts which it connects, so as to draw the cocking member downward upon the guiding web and drop it behind the sear when the latter is reached.

17. In a gun having a slotted barrel and a magazine, a magazine closure, and a manually operated shot conveyer mounted within the magazine and working in the slot of the barrel and movable from a position communicating with the magazine to a position communicating with the bore of the gun.

18. In a gun having a slotted barrel and a magazine, a magazine closure, and a sight member mounted within the magazine and working in said slot, said sight member constructed with a shot receptacle, and movable from a position communicating with the magazine to a position communicating with the bore of the gun.

19. In a gun having a slotted barrel and a magazine, a magazine closure, a sight member working in said slot and constructed with a shot receptacle, and movable from a position communicating with the magazine to a position communicating with the bore of the gun, and means normally retaining the sight member in the position first named.

20. In a gun having a suitable bore, a magazine having a port located to pass a shot from the magazine directly to the bore, a conveying member having a shot receptacle, manually movable from a position communicating with the magazine to a position communicating with the bore and forcing a shot through said port in said movement; said forwarding means being pivotally mounted upon the magazine, and a spring mounted upon the gun barrel and engaging the conveying member for returning said conveying member to its position of communication with the magazine.

ELBERT HAMILTON SEARLE.

In presence of—
 LAURA E. MONK,
 HARRY A. KNIGHT.